(12) United States Patent
Yee et al.

(10) Patent No.: US 9,437,237 B1
(45) Date of Patent: Sep. 6, 2016

(54) METHOD TO DETECT POWER LOSS THROUGH DATA STORAGE DEVICE SPINDLE SPEED

(71) Applicant: Western Digital Technologies, Inc., Irvine, CA (US)

(72) Inventors: Cheng Fatt Yee, Subang Jaya (MY); Wei San Pang, Puchong (MY)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 14/627,590

(22) Filed: Feb. 20, 2015

(51) Int. Cl.
*G11B 5/02* (2006.01)
*G11B 19/28* (2006.01)
*G11B 19/20* (2006.01)
*G11B 19/26* (2006.01)

(52) U.S. Cl.
CPC .............. *G11B 19/28* (2013.01); *G11B 19/20* (2013.01); *G11B 19/26* (2013.01); *G11B 2220/90* (2013.01)

(58) Field of Classification Search
None
See application file for complete search history.

(56) References Cited

U.S. PATENT DOCUMENTS

| | | |
|---|---|---|
| 4,495,621 A | 1/1985 | Nakagomi et al. |
| 5,307,439 A * | 4/1994 | Enami ............... G11B 19/28 388/811 |
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |

(Continued)

*Primary Examiner* — Tan X Dinh

(57) ABSTRACT

A method for detecting power loss on a data storage device (DSD) includes: as part of a device initialization of the DSD, measuring a rotational speed of a spindle of a rotating media; comparing the measured spindle rotational speed to a threshold rotational speed value; and based on the comparison, determining whether the device initialization has been triggered due to a power-on reset of the DSD.

24 Claims, 6 Drawing Sheets

(56) References Cited

U.S. PATENT DOCUMENTS

| | | |
|---|---|---|
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,639,749 B1 * | 10/2003 | Kazmierczak ........... G11B 5/54 360/75 |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,751,079 B2 | 6/2004 | Bretschneider |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |

(56) References Cited

U.S. PATENT DOCUMENTS

| | | |
|---|---|---|
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2004/0085668 A1* | 5/2004 | Sakamoto ............... G11B 19/20 360/73.03 |
| 2007/0103809 A1* | 5/2007 | Lee ............... G11B 21/12 360/75 |
| 2010/0035085 A1 | 2/2010 | Jung et al. |
| 2011/0299247 A1* | 12/2011 | Zhang ............... H02P 6/16 361/695 |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

US 9,437,237 B1

METHOD TO DETECT POWER LOSS THROUGH DATA STORAGE DEVICE SPINDLE SPEED

BACKGROUND

1. Technical Field

Apparatuses and methods consistent with the present inventive concept relate to detecting loss of power in a data storage device (DSD), and more particularly to detecting power loss in a DSD based on rotational speed of a spindle of a rotating media.

2. Related Art

When connected to a host system, a DSD may experience failures related to power loss events. For example, a write splice, whereby a write operation to the DSD storage media is interrupted part way through the operation, may occur as a result of a sudden power loss (i.e., a power glitch or power drop-out). The power loss may be due to faulty power supplies, unstable voltage supply lines, defective or loose connectors, etc. The power loss may be only milliseconds in duration but may be severe enough to cause the DSD to initiate power-on reset (PoR).

Users of the host system (e.g., laptop computers, desktop computers, factory test equipment, etc.) may not be aware of the power loss since the DSD will automatically reconnect and reinitialize. In order to provide feedback to host system users, power loss events should be counted. Features currently exist that detect low power supply voltages to prevent the write operations from occurring; however, an abrupt power loss will not be logged as an event.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Overview

Sudden power loss due to, for example faulty power supplies, unstable voltage supply lines, defective or loose connectors, etc., may be only milliseconds in duration but may be severe enough to cause the DSD to initiate a PoR. Rotational speed of a spindle driving rotating media may differ during DSD device initialization between a power-up of a DSD from standstill and rotational speed of the spindle caused by sudden power loss. The difference in spindle rotational speed may be used to differentiate DSD initiated resets from sudden power loss events.

Detecting Power Loss Through Spindle Speed

Figure 1:
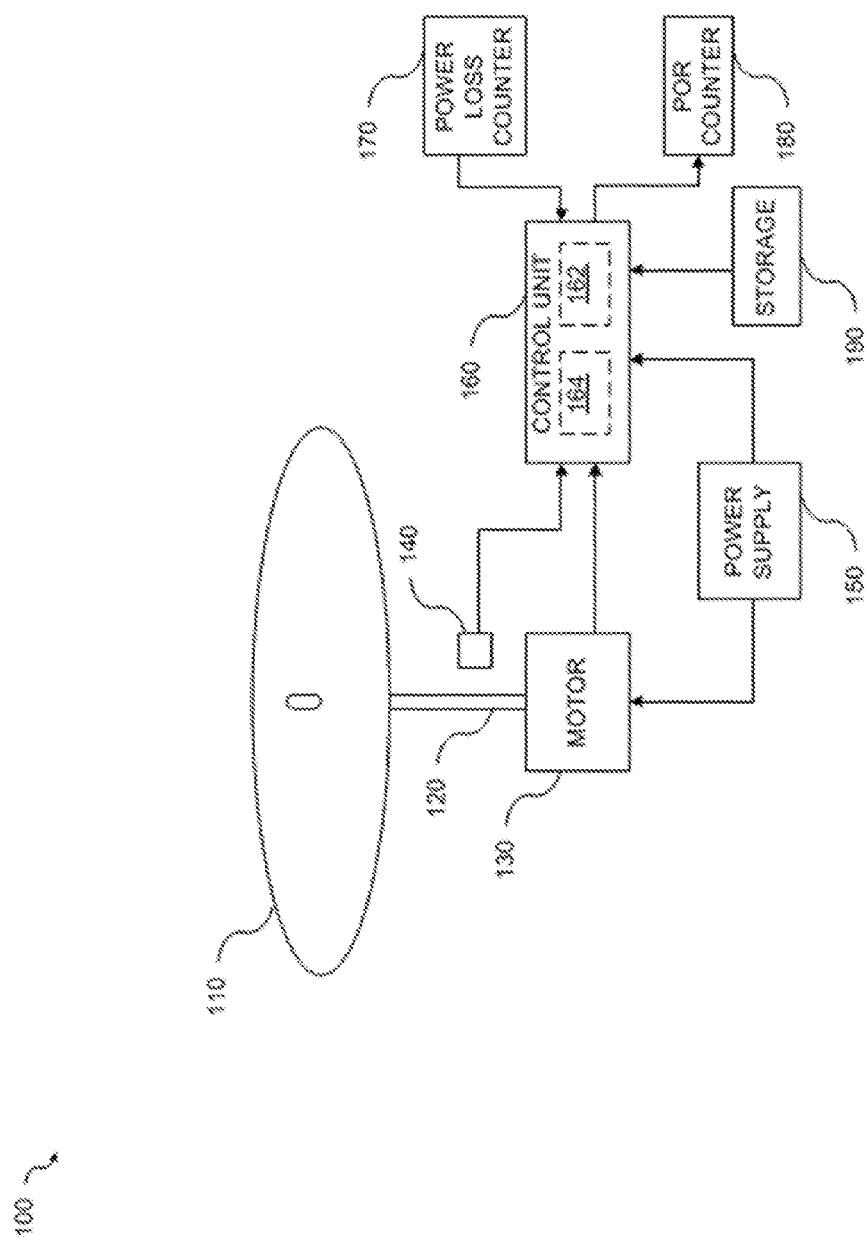
FIG. 1 is a block diagram illustrating a data storage device (DSD) according to various embodiments.

FIG. 1 is a block diagram illustrating a data storage device (DSD) 100 according to various embodiments. Referring to FIG. 1, the DSD may include storage media 110, a spindle 120, a motor 130, a rotational speed sensor 140, a power supply 150, a control unit 160, a power-loss counter 170, a PoR counter 180, and nonvolatile storage 190.

The spindle 120 may be connected to the motor 130 and the storage media 110 to cause the storage media 110 to rotate. The rotational speed sensor 140 may sense a rotational speed of the spindle 120 and provide a signal to the control unit 160. One of ordinary skill in the art will appreciate that the rotational speed sensor 140 may be any type of rotational speed sensor known to those in the art without departing from the scope of the present inventive concept.

The control unit 160 may determine the rotational speed of the spindle 120 based at least in part on the signal from the rotational speed sensor 140. The control unit 160 may control overall operation of the DSD 100 and its components. The control unit 160 may be, for example, but not limited to, a microcontroller, microprocessor, or other programmable device. The control unit 160 may include internal storage 162, for example, but not limited to, volatile and/or nonvolatile storage. The control unit 160 may include a threshold value counter 164.

The power-loss counter 170 may be incremented to count power loss events determined by the control unit 160. The power-loss counter 170 may be implemented as part of the control unit 160 or may be implemented as circuitry separate from the control unit 160. One of ordinary skill in the art will appreciate that the power-loss counter 170 may be implemented as hardware, software, firmware, or a combination thereof without departing from the scope of the present inventive concept.

The PoR counter 180 may be incremented to count power-on reset events. The PoR counter 180 may be implemented as part of the control unit 160 or may be implemented as circuitry separate from the control unit 160. One of ordinary skill in the art will appreciate that the PoR counter 180 may be implemented as hardware, software, firmware, or a combination thereof without departing from the scope of the present inventive concept.

The nonvolatile storage 190 may store programs necessary for operation of the DSD 100 that are executed by the control unit 160, as well as application data and system data, for example, but not limited to, data generated by the power-loss counter 170 and/or PoR counter 180.

The power supply 150 may provide electrical power for the DSD.

Figure 2:
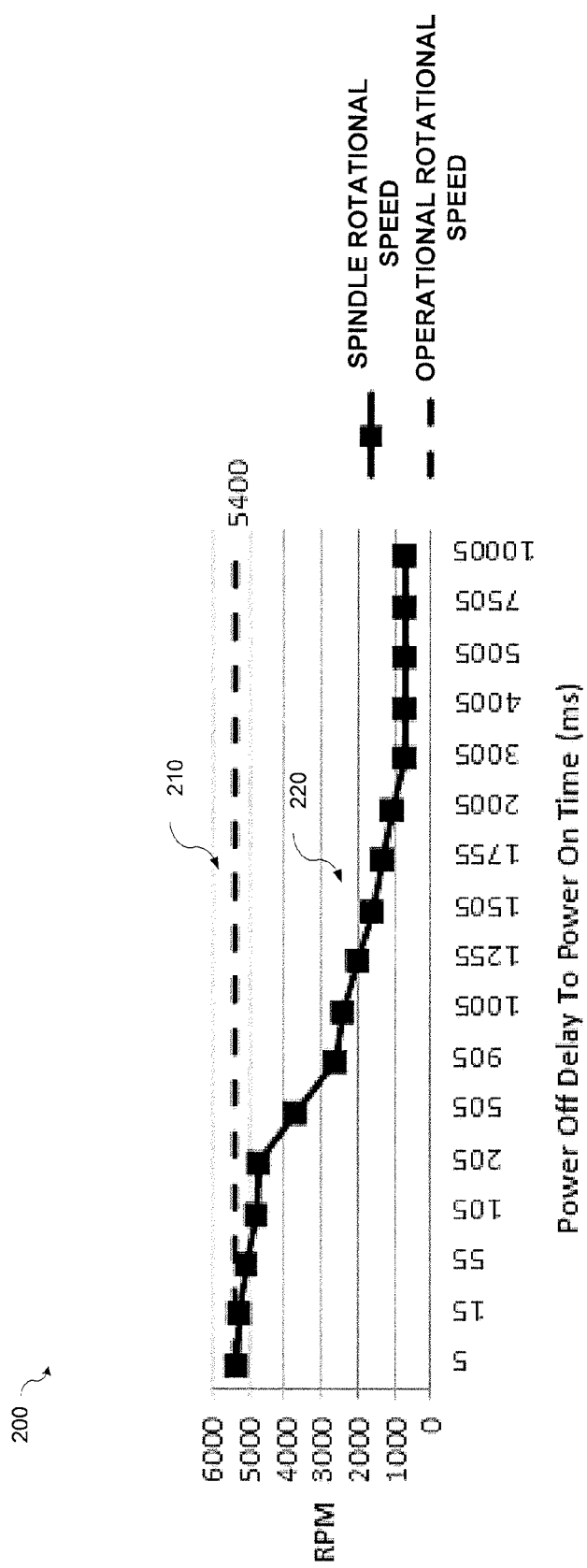
FIG. 2 is a graph illustrating a relationship of spindle rotational speed with respect to time from power loss for a DSD according to various embodiments.

FIG. 2 is a graph 200 illustrating a relationship of spindle rotational speed (Y axis, in rotations per minute (RPM)) with respect to time from power loss (X axis, in milliseconds) for a DSD according to various embodiments. Referring to FIGS. 1 and 2, during normal operation, the spindle 120 will rotate at a substantially constant operational rotational speed 210 (5,400 RPM in the example shown). Spindle 120 rotational speed 220 may decrease when electrical power is removed from the DSD 100. One of ordinary skill in the art will appreciate that the illustrated line 210 representing operational rotational speed of the spindle 120 and the illustrated curve 220 representing rotational speed of the spindle 120 are only exemplary, and various operational rotational speeds and spindle rotational speeds may apply to various embodiments without departing from the scope of the present inventive concept.

Rotational speed 220 of the spindle 120 may differ during DSD 100 device initialization when the initialization is caused by a cold boot (i.e., a DSD 100 powering up from standstill) as compared to when the initialization is caused by a reset caused by sudden power loss. Sudden power loss may result in higher rotational speed 220 of the spindle 120 at an initial point of DSD 100 device initialization. For example, as shown in FIG. 2, the rotational speed only decreases slightly, for example, to about 5,000 RPM about 55 ms from power loss. So if a DSD experiences a power glitch or interruption of short duration, when power is restored and the DSD undergoes an initialization, the rotational speed may still be relatively high and close to the operational speed. Thus, rotational speed 220 of the spindle 120 may be measured during an initial portion of the DSD 100 device initialization path to determine the cause of the initialization. The DSD 100 device initialization path is normally only taken only once during a PoR of the DSD 100 or during DSD 100 initiated resets. Device initialization caused by DSD 100 initiated resets may be differentiated from device initialization caused by PoR of the DSD 100, through measuring the rotational speed. During device initialization caused by DSD 100 initiated resets, system variables may be preserved and may be evaluated to determine that device initialization was caused by a DSD 100 initiated event.

Figure 3A:
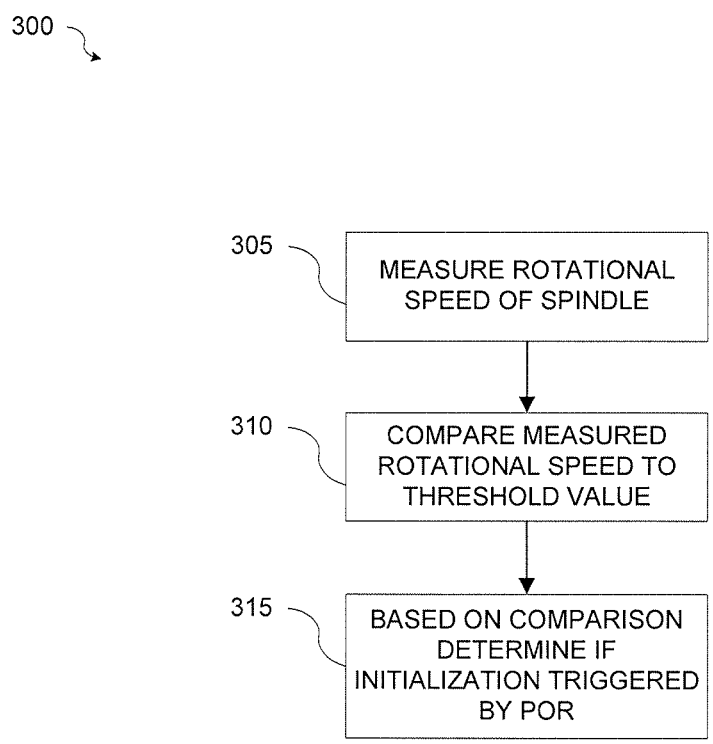
FIG. 3A is a flow chart illustrating a method according to various embodiments.

FIG. 3A is a flow chart illustrating a method 300 according to various embodiments. Referring to FIGS. 1-3A, as part of a device initialization of the DSD 100, rotational speed of the spindle 120 may be measured (305). For example, the rotational speed sensor 140 may sense the rotational speed of the spindle 120 and transmit a signal proportional to the rotational speed to the control unit 160. The control unit 160 may determine the rotational speed of the spindle 120 based on the signal received from the rotational speed sensor 140.

The control unit 160 may compare the measured rotational speed of the spindle 120 to a threshold rotational speed value (310). The threshold rotational speed value may be determined based on a rotational speed difference of the spindle 120 from an operational rotational speed 210 of the spindle 120 (see FIG. 2), and may be stored in the nonvolatile storage 190 and/or the internal storage 162 of the control unit 160. For example, a threshold rotational speed value of 5,000 RPM may be used. The threshold rotational speed value may be adjustable via a value stored in the nonvolatile storage 190 and/or the internal storage 162 of the control unit 160. Based on the comparison of the measured rotational speed of the spindle 120 to the threshold rotational speed value, the control unit 160 may determine if the DSD 100 device initialization was triggered by PoR of the DSD 100 (315). Following up on the example set forth above, a measured rotational speed over the threshold rotational speed value of 5,000 RPM may indicate that the device initialization was triggered by PoR.

Figure 3B:
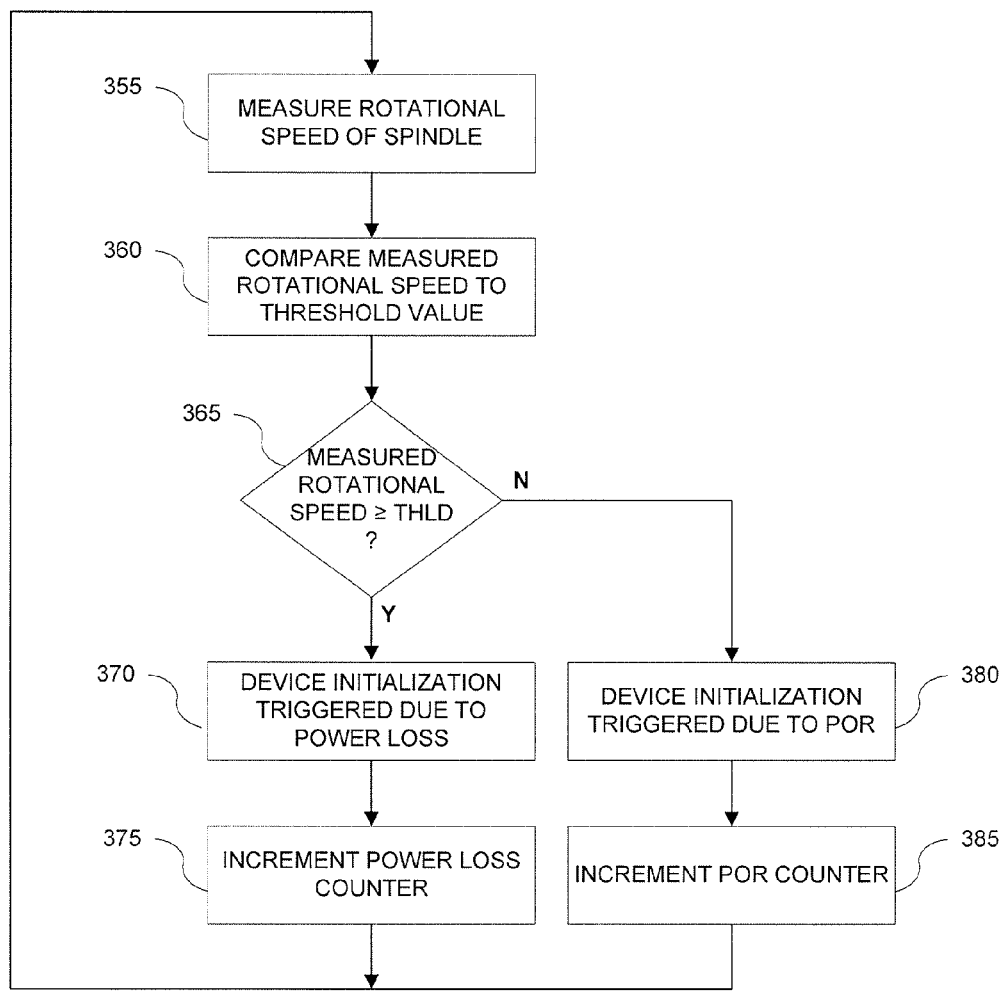
FIG. 3B is a flow chart illustrating a method according to various embodiments.

FIG. 3B is a flow chart illustrating a method 350 according to various embodiments. Referring to FIGS. 1, 2 and 3B, as part of a device initialization of the DSD 100, rotational speed of the spindle 120 may be measured (355). For example, the rotational speed sensor 140 may sense the rotational speed of the spindle 120 and transmit a signal proportional to the rotational speed to the control unit 160. The control unit 160 may determine the rotational speed of the spindle 120 based on the signal received from the rotational speed sensor 140.

The control unit 160 may compare the measured rotational speed of the spindle 120 to a threshold rotational speed value (310). The threshold rotational speed value may be determined based on a rotational speed difference of the spindle 120 from an operational rotational speed 210 of the spindle 120 (see FIG. 2), The threshold rotational speed value may be adjustable via a value stored in the nonvolatile storage 190 and/or the internal storage 162 of the control unit 160. The control unit 160 may determine if the measured rotational speed of the spindle 120 is equal to or greater than a threshold rotational speed value (365).

If the control unit 160 determines that the measured rotational speed of the spindle 120 is equal to or greater than a threshold rotational speed value (365—Y), the control unit 160 may determine that the DSD 100 device initialization was triggered by a power loss event (370). The control unit 160 may increment a count of the power-loss counter 170 (370) indicating that the DSD 100 device initialization was triggered by the power loss event.

The control unit 160 may cause the count of the power-loss counter 170 to be stored in the nonvolatile storage 190. Alternatively or additionally, the control unit 160 may cause the count of the power-loss counter 170 to be stored on the rotating storage media 110.

If the control unit 160 determines that the measured rotational speed of the spindle 120 is not equal to or greater than a threshold rotational speed value (365—N), the control unit 160 may determine that the DSD 100 device initialization was triggered by a PoR event (380). The control unit 160 may increment a count of the PoR counter 180 (385) indicating that the DSD 100 device initialization was triggered by the PoR event. In other embodiments, if the measured rotational speed is equal to the threshold, the 365-N path is taken instead.

Figure 4A:
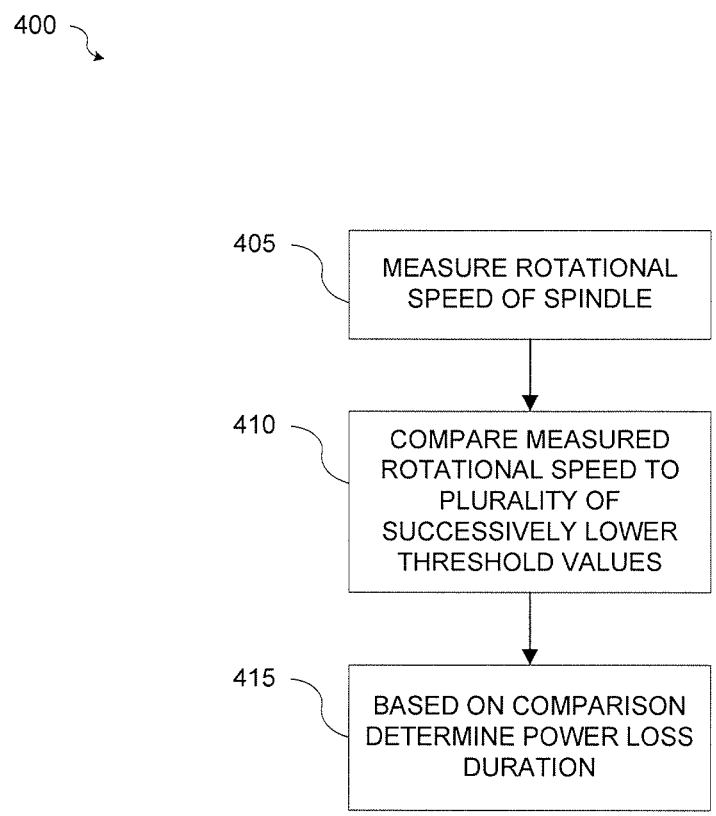
FIG. 4A is a flow chart illustrating a method of operation of an apparatus according to various embodiments.
Figure 4B:
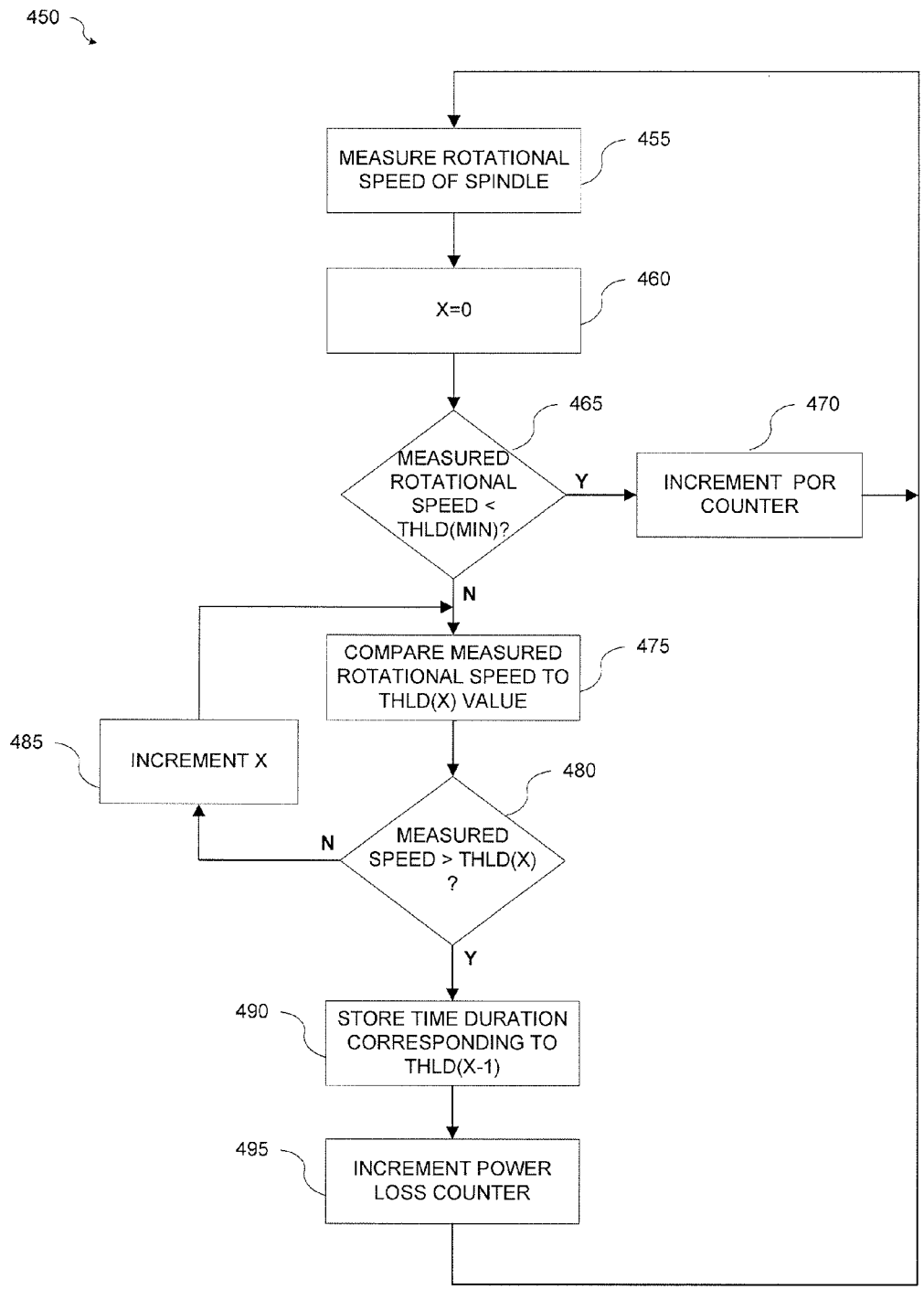
FIG. 4B is a flow chart illustrating a method of operation of an apparatus according to various embodiments.

In addition to detecting device initialization caused by PoR, measuring rotational speed may also be useful for estimating the duration of the power loss/interruption, as further illustrated by FIGS. 4A and 4B. FIG. 4A is a flow chart illustrating a method of operation 400 of an apparatus, for example, but not limited to, the DSD 100, according to various embodiments. Referring to FIGS. 1, 2 and 4A, as part of a device initialization of the DSD 100, rotational speed of the spindle 120 may be measured (405). For example, the rotational speed sensor 140 may sense the rotational speed of the spindle 120 and transmit a signal proportional to the rotational speed to the control unit 160. The control unit 160 may determine the rotational speed of the spindle 120 based on the signal received from the rotational speed sensor 140.

The control unit 160 may compare the measured rotational speed of the spindle 120 to a plurality of successively lower threshold rotational speed values corresponding to successively longer time durations (410). The threshold rotational speed values may be determined based on rotational speed differences of the spindle 120 from an operational rotational speed 210 of the spindle 120 (see FIG. 2), and may be stored in the nonvolatile storage 190 and/or the internal storage 162 of the control unit 160. The threshold rotational speed values may be adjustable via values stored in the nonvolatile storage 190 and/or the internal storage 162 of the control unit 160. Based on the comparison of the measured rotational speed of the spindle 120 to the successively lower threshold rotational speed values, the control unit 160 may determine a power loss duration for a power loss event (415). As shown in FIG. 2, there is a relationship (e.g., curve 220) between the rotational speed and the duration of power loss. Such a relationship may be determined by characterization of the DSD based on observation under a power loss condition. Thus, once such relationship is known/characterized, a series of threshold rotational speed values may be set accordingly, with corresponding power loss durations set based on the relationship (e.g., stored as a look up table or as a function). In one embodiment, when the successive comparisons as described above are made, the first comparison at which the measured rotational speed exceeds or equals to a threshold rotational value of the series, may indicate an approximate power loss duration.

FIG. 4B is a flow chart illustrating a method of operation 450 of an apparatus, for example, but not limited to, the DSD 100, according to various embodiments. Referring to FIGS. 1, 2 and 4B, as part of a device initialization of the DSD 100, rotational speed of the spindle 120 may be measured (455). For example, the rotational speed sensor 140 may sense the rotational speed of the spindle 120 and transmit a signal proportional to the rotational speed to the control unit 160. The control unit 160 may determine the rotational speed of the spindle 120 based on the signal received from the rotational speed sensor 140.

The control unit 160 may initialize the threshold value counter 164 (460). The control unit 160 may compare the measured rotational speed of the spindle 120 to a minimum threshold rotational speed value (465). If the control unit 160 determines that the measured rotational speed of the spindle 120 is less than a minimum threshold rotational speed value (465—Y), the control unit 160 may determine that the DSD 100 device initialization was triggered by a PoR event and may increment a count of the PoR counter 180 (470) indicating that the DSD 100 device initialization was triggered by the PoR event.

If the control unit 160 determines that the measured rotational speed of the spindle 120 is not less than a minimum threshold rotational speed value (465—N), the control unit 160 may compare the measured rotational speed of the spindle 120 to a threshold speed value corresponding to the count of the threshold value counter 164 (480).

If the control unit 160 determines that the measured rotational speed of the spindle 120 is not greater than the threshold speed value corresponding to the count of threshold value counter 164 (480—N), the control unit 160 may increment the count of the threshold value counter 164 (485). The control unit 160 may compare the measured rotational speed of the spindle 120 to a next threshold speed value corresponding to the threshold value counter 164 (475). The control unit 160 may repeat compare (475), determine (480), and increment (485) operations for successively lower threshold rotational speed values corresponding to successively longer time durations that correspond to the count of the threshold value counter 164. As illustrated in FIG. 2, the rotational speed of the spindle 120 decreases with increasing time duration from power loss. The successively lower threshold rotational speed values and the minimum threshold rotational speed value may be determined based on rotational speed differences of the spindle 120 from an operational rotational speed 210 of the spindle 120 (see FIG. 2), and may be stored in the nonvolatile storage 190 and/or the internal storage 162 of the control unit 160.

If the control unit 160 determines that the measured rotational speed of the spindle 120 is greater than a threshold speed value corresponding to the count of the threshold value counter 164 (480—Y), the control unit 160 may store a time duration corresponding to a threshold speed value immediately preceding the threshold speed value corresponding to the count of the threshold value counter 164 (490). The control unit 160 may increment the count of the power-loss counter 170 (495).

The control unit 160 may cause the time duration and the count of the power-loss counter 170 to be stored in the nonvolatile storage 190. Alternatively or additionally, the control unit 160 may cause the time duration and the count of the power-loss counter 170 to be stored on the rotating storage media 110.

One of ordinary skill in the art will appreciate that the operations described with respect to FIGS. 3A, 3B, 4A, and 4B may be implemented as a non-transitory computer readable medium having stored therein instructions for executing the described operations.

While certain embodiments have been described, these embodiments have been presented by way of example only, and are not intended to limit the scope of the protection. The methods and systems described herein may be embodied in a variety of other forms. Various omissions, substitutions, and/or changes in the form of the example methods and systems described herein may be made without departing from the spirit of the protection.

The accompanying claims and their equivalents are intended to cover such forms or modifications as would fall within the scope and spirit of the protection. For example, the example systems and methods disclosed herein can be applied to hard disk drives, hybrid hard drives, and the like. In addition, other forms of storage, for example, but not limited to, DRAM or SRAM, battery backed-up volatile DRAM or SRAM devices, EPROM, EEPROM memory, etc., may additionally or alternatively be used. As another example, the various components illustrated in the figures may be implemented as software and/or firmware on a processor, ASIC/FPGA, or dedicated hardware. Also, the features and attributes of the specific example embodiments disclosed above may be combined in different ways to form additional embodiments, all of which fall within the scope of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for detecting power loss on a data storage device (DSD), the method comprising:
    as part of a device initialization of the DSD, measuring a rotational speed of a spindle of a rotating media;
    comparing the measured spindle rotational speed to a threshold rotational speed value; and
    based on the comparison, determining whether the device initialization has been triggered due to a power-on reset of the DSD,
    wherein the method is performed under the control of a processor.

2. The method of claim 1, further comprising:
    in response to a determination that the measured spindle rotational speed is equal to or greater than the threshold rotational speed value, incrementing a count of a power-loss counter.

3. The method of claim 2, wherein the count of the power-loss counter is stored in nonvolatile storage.

4. The method of claim 2, wherein the count of the power-loss counter is stored on the rotating media.

5. The method of claim 1, further comprising:
in response to a determination that the measured spindle rotational speed is less than the threshold rotational speed value, incrementing a count of a power-on reset counter.

6. The method of claim 1, wherein the threshold rotational speed value is based on a rotational speed difference from an operational rotational speed of the spindle.

7. The method of claim 1, wherein the threshold rotational speed value is adjustable.

8. A data storage device (DSD), comprising:
rotating media;
a spindle configured to cause the rotating media to rotate;
a rotational speed sensor configured to sense a rotational speed of the spindle as part of a device initialization of the DSD;
a power-loss counter configured to count power-loss events; and
a control unit configured to:
determine the rotational speed of the spindle based on a signal from the rotational speed sensor;
compare the determined rotational speed of the spindle to a threshold rotational speed value; and
based on the comparison, determine whether the device initialization has been triggered due to a power-on reset of the DSD.

9. The DSD of claim 8, wherein in response to a determination that the spindle rotational speed is equal to or greater than the threshold rotational speed value, the control unit is further configured to increment a count of the power-loss counter.

10. The DSD of claim 9, further comprising:
nonvolatile storage,
wherein the control unit is further configured to store the count of the power-loss counter in the nonvolatile storage.

11. The DSD of claim 9, wherein the control unit is further configured to store the count of the power-loss counter on the rotating media.

12. The DSD of claim 8, further comprising:
a power-on reset counter,
wherein in response to a determination that the spindle rotational speed is less than the threshold rotational speed value, the control unit is further configured to increment a count of the power-on reset counter.

13. A non-transitory computer readable medium having stored therein a program for making a processor execute a method for detecting power loss on a data storage device (DSD), said program including executable instructions for performing operations comprising:
as part of a device initialization of the DSD, measuring by the processor a rotational speed of a spindle of a rotating media;
comparing by the processor the measured spindle rotational speed to a threshold rotational speed value; and
based on the comparison, determining by the processor whether the device initialization has been triggered due to a power-on reset of the DSD.

14. The non-transitory computer readable medium having stored therein a program as defined in claim 13, the program further comprising executable instructions for performing operations including:
in response to a determination that the spindle rotational speed is equal to or greater than the threshold rotational speed value, incrementing a count of a power-loss counter.

15. The non-transitory computer readable medium having stored therein a program as defined in claim 14, the program further comprising executable instructions for performing operations including:
storing the count of the power-loss counter in nonvolatile storage.

16. The non-transitory computer readable medium having stored therein a program as defined in claim 14, the program further comprising executable instructions for performing operations including:
storing the count of the power-loss counter on the rotating media.

17. The non-transitory computer readable medium having stored therein a program as defined in claim 13, the program further comprising executable instructions for performing operations including:
in response to a determination that the spindle rotational speed is less than the threshold rotational speed value, incrementing a count of a power-on reset counter.

18. The non-transitory computer readable medium having stored therein a program as defined in claim 13, the program further comprising executable instructions for performing operations including:
determining the threshold rotational speed value based on a rotational speed difference from an operational rotational speed of the spindle.

19. An apparatus for detecting power loss duration on a data storage device (DSD), the apparatus comprising:
a control unit configured to, as part of a device initialization of the DSD:
measure a rotational speed of a spindle of a rotating media;
compare the measured spindle rotational speed to a plurality of successively lower threshold rotational speed values corresponding to successively longer time durations; and
determine a power loss duration based on comparisons of the measured spindle rotational speed with the plurality of successively lower threshold rotational speed values.

20. The apparatus of claim 19, wherein the control unit is further configured to:
in response to a determination that the measured spindle rotational speed is greater than one of the successively lower threshold rotational speed values:
store a time duration corresponding to an immediately preceding threshold rotational speed value as a power loss duration, and
increment a count of a power-loss counter.

21. The apparatus of claim 20, wherein the control unit is further configured to store the count of the power-loss counter in nonvolatile storage.

22. The apparatus of claim 20, wherein the control unit is further configured to store the count of the power-loss counter on the rotating media.

23. The apparatus of claim 19, wherein the control unit is further configured to:
in response to a determination that the measured spindle rotational speed is less than a minimum threshold rotational speed value, incrementing a count of a power-on reset counter.

24. The apparatus of claim 19, wherein the successively lower threshold rotational speed values are based on rotational speed differences from an operational rotational speed of the spindle.

\* \* \* \* \*